INVENTORS
RICHARD C. ECKLUND
ANDREW F. EDGE
BY Robert O. Richardson
ATTORNEY

United States Patent Office 3,363,086
Patented Jan. 9, 1968

3,363,086
RESISTANCE SPOT WELDING OF
COLUMBIUM ALLOY
Richard C. Ecklund, Long Beach, and Andrew F. Edge, Lakewood, Calif., assignors to McDonnell Douglas Corporation, Santa Monica, Calif., a corporation of Maryland
Filed Nov. 12, 1964, Ser. No. 410,807
4 Claims. (Cl. 219—119)

ABSTRACT OF THE DISCLOSURE

Troublesome electrode sticking in resistance spot welding of columbium alloys is eliminated through the use of electrodes made of copper material plated on a tip portion thereof with either rhenium or rhodium.

Background of the invention

The high speeds of supersonic aircraft have created heat problems in addition to existing strength to weight ratio problems. Super alloys and refractory metal alloys are used to produce sandwich structures that will meet these rigid requirements. In the past several years considerable interest has been shown in columbium as a space age metal because of its high strength at elevated temperatures. It has many uses in high temperature environment and as such replaces conventional metals. Its use, as any other metal, requires metal joining processes in the construction of sandwich panels or in the making of other parts. Resistance spot welding is one of many processes used in metal joining. This technique has the advantage that no filler metals are used. It is rapid, and little or no heat distortion results. This technique therefore is very desirable and has many applications.

Because columbium has a melting point of approximately 3500 degrees Fahrenheit, it presents a problem in the welding operations. One of the problems is that of electrode sticking. Heat is generated from the resistance to the welding current at the faying surface of the tip and the material. Also, heat from a nugget formation at the interface of the material migrates to the surface of the material itself. Heat thus generated is at a higher temperature than the melting point of the copper alloy electrodes, whose melting point is approximately 1994° Fahrenheit. Due to the low thermal conductivity of the columbium, this heat does not dissipate sufficiently with the result that the copper electrode tip face melts and bonds to the columbium surface.

Mechanical abrading and chemical cleaning of the tip side of the columbium has reduced tip sticking. However, with these methods the electrode life does not exceed 5 spot welds before electrode sticking occurs. Because of the need for welding at a temperature higher than the melting point of the electrode, the use of electrodes having a higher melting point would seem to be an obvious solution. However, such materials normally have an electrical resistivity too great, and heat is generated at the faying surface, causing a sticking problem again. Other approaches to the problem of preventing sticking of resistance spot welding electrodes to the metal being welded are in weld current control in the welding of light metals and alloys with high conductivity, the use of steel plates between electrodes and the welding of aluminum or aluminum alloys, the use of tungsten carbide tips in vacuum tube welding, the use of copper and carbon mixture electrodes in welding carbonized nickel and using a circuit interrupter with electrode contacts of a silver and carbon mixture to prevent sticking or welding of the contacts. However, none of these approaches have been satisfactory in the welding of columbium.

Summary of the invention

In accordance with one form of the present invention, the sticking of electrodes is prevented by bonding the face of the electrodes with a material having a low resistance so that it generates little heat in resistance spot welding. The bonded material has high thermal conductivity so that it conducts heat away instead of allowing temperature to build up. It also has a high melting point so that it withstands the high welding temperatures. An example of such an electrode in the welding of columbium is rhodium-plated copper. In the practice of this form of the present invention the copper faces of the electrode are electro-plated with 0.0002 inch of rhodium over 0.0005 inch of nickel. With such an electrode tip, no electrode sticking occurred even after hundreds of welds. In an alternate form a bar or rod insert of this material is pressed into an appropriately prepared seat to form the welding face of the electrode.

It is therefore an object of the present invention to provide a means for avoiding electrode sticking in the resistance spot welding of high temperature resistant materials.

Another object is the provision of means to prevent electrode sticking in the resistance spot welding of columbium alloys.

Another object is the provision of a novel electrode for use in the resistance spot welding of high temperature resistant alloys.

Another object is the provision of a novel electrode which resists electrode sticking when used in resistance spot welding of columbium alloys.

Another object is the provision of means for avoiding electrode sticking in the welding of high temperature alloys through the use of an electrode of relatively low electrical resistivity, of relatively high thermal conductivity, and of a melting point similar to or higher than the alloy to be welded.

Other objects will become apparent as a description of this invention proceeds, wherein.

Description of present embodiments

Two most popular columbium alloys are D-36 and B-66. Columbium D-36 is a columbium alloy manufactured by du Pont and consists of titanium 10% by weight, zirconium 5% and the rest columbium. B-66 is a columbium alloy made by Westinghouse and consists of vanadium 5% by weight, molybdenum 5%, zirconium 1%, oxygen .012%, nitrogen .006%, carbon .006%, and the rest columbium. In accordance with the present invention it is desirable to have an electrode with a high melting point, low resistance and high thermal conductivity. In order to accomplish the desired results, it has been found that if the copper electrode is plated with .0002 inch of rhodium over .0005 inch of nickel the above characteristics are achieved and electrode sticking does not become a problem when used with du Pont D-36 columbium. In spot welding Westinghouse B-66 columbium, it is preferable to use a copper alloy electrode coated with rhenium. Its melting point is higher and its electrical resistivity is lower than the B-66 as noted on the following chart:

|  | Copper Electrode | Rhodium Material | Columbium D-36 | Rhenium Material | Columbium B-66 |
|---|---|---|---|---|---|
| Melting Pt., °F | 1,994 | 3,571 | 3,500 | 5,755 | 4,300 |
| Electrical Resistivity (microhm/cm.) | 2.03 | 4.51 | 12.5 | 19.3 | 22. |
| Thermal Conductivity (68° F.) (cal./sq. cm./cm./° C.) | 0.77 | 0.21 | 0.13 | 0.17 | 0.125 |

As noted from the above examples, rhodium has a melting point slightly higher than D-36 and rhenium has melting point considerably higher than B-66. The electrical resistivity of the plating materials is lower than the columbium alloys with which the plating materials are to be used. The thermal conductivity of the plating materials is higher than their respective alloys.

Figure 1:
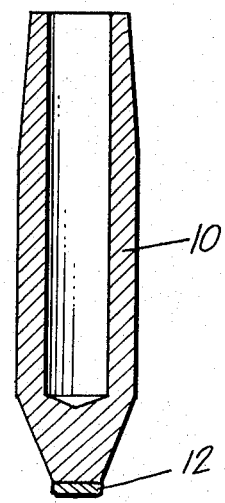
FIGURE 1 is a sectional view of an electrode with plated tip.

Referring now to FIGURE 1, there is shown an electrode 10 preferably of 5/8" diameter and of conventional construction to which an annealed material 12 such as rhodium or rhenium has been brazed.

Figure 2:
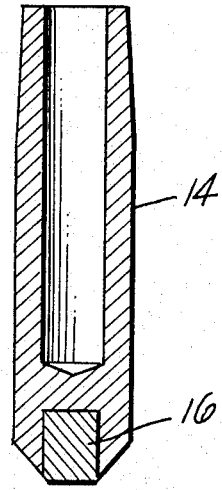
FIGURE 2 is a sectional view of an electrode with an insert tip.

The electrode 14 in FIGURE 2 is similar to that in FIGURE 1, except that it has a 3/16" diameter recessed 1/4" deep into which a bar of rhodium or rhenium may be inserted, preferably with a press fit.

While the foregoing examples are thought to be illustrative of the present invention, it is not believed that the present invention should be limited thereto, but should be accorded the broadest scope set forth in the appended claims.

What is claimed is:

1. A welding electrode for welding columbium, said electrode being of copper material plated on a tip portion thereof with rhodium.

2. A resistance welding electrode for spot-welding columbium and its alloys, tantalum and its alloys, molybdenum and its alloys, and tungsten and its alloys;
said electrode being of a heat treatable copper alloy material with a high melting point, and a tip portion having an electrical conductive material of rhodium or rhenium bonded thereto.

3. A welding electrode for welding columbium, said electrode being of copper material plated on a tip portion thereof with rhenium.

4. A resistance welding electrode for spot-welding columbium and its alloys, tantalum and its alloys, molybdenum and its alloys, and tungsten and its alloys;
said electrode being of a heat treatable copper alloy material with a high melting point, and a tip portion having an electrical conductive material of rhenium bonded thereto.

References Cited

UNITED STATES PATENTS

| 2,180,396 | 11/1939 | Burke | 219—119 |
| 2,186,319 | 1/1940 | Bilton | 219—120 |
| 2,257,566 | 9/1941 | Lewis | 219—120 |
| 2,317,681 | 4/1943 | Fletcher | 219—120 |
| 2,320,920 | 6/1943 | Fletcher | 219—120 |
| 2,431,334 | 11/1947 | Lambert | 219—119 |
| 2,795,688 | 6/1957 | McCaffrey | 219—119 |
| 2,830,169 | 4/1958 | Medicus | 219—118 |
| 3,263,059 | 7/1966 | Rzant | 219—119 |

RICHARD M. WOOD, *Primary Examiner.*

W. D. BROOKS, *Assistant Examiner.*